F. MARQUARDT.
BEER FAUCET.
APPLICATION FILED JUNE 12, 1915.
1,177,529.    Patented Mar. 28, 1916.
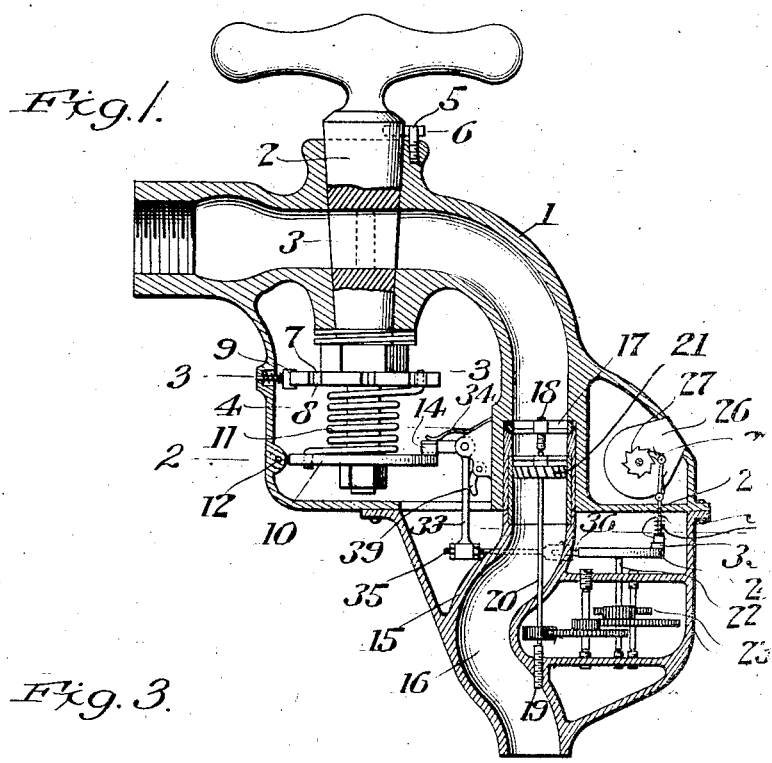
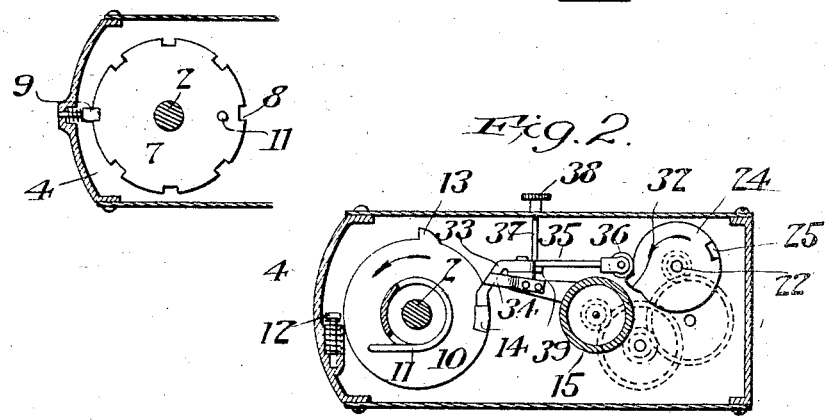
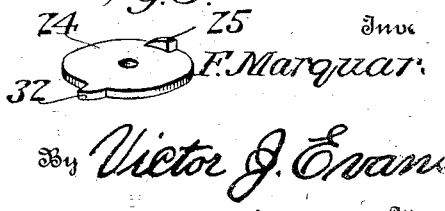
Inventor
F. Marquardt
By Victor J. Evans
Attorney
Witnesses
H. E. Laughlin
M. L. Taft

UNITED STATES PATENT OFFICE.

FREDERICK MARQUARDT, OF BROOKLYN, NEW YORK, ASSIGNOR OF ONE-HALF TO CHARLES OBERT, OF BROOKLYN, NEW YORK.

BEER-FAUCET.

1,177,529.  Specification of Letters Patent.  Patented Mar. 28, 1916.

Application filed June 12, 1915. Serial No. 33,749.

*To all whom it may concern:*

Be it known that I, FREDERICK MARQUARDT, a citizen of the United States, residing at Brooklyn, in the county of Kings and State of New York, have invented new and useful Improvements in Beer-Faucets, of which the following is a specification.

This invention relates to faucets and it consists in the novel features hereinafter described and claimed.

An object of the invention is to provide a faucet especially adapted to be used for dispensing beer, ale or the like, and the faucet is provided with a meter which is operated by the passage of the liquid through the same to register the quantities of liquid drawn through the faucet.

With the above object in view the faucet includes a body having a valve turnably mounted therein, and a counter mounted upon the body. A turbine member is rotatably mounted in the faucet and means connects the said turbine member with the counter, whereby the counter is operated by the turbine member.

In the accompanying drawing:—Figure 1 is a vertical sectional view of the faucet. Fig. 2 is a horizontal sectional view of the same cut on the line 2—2 of Fig. 1. Fig. 3 is a similar view cut on the line 3—3 of Fig. 1. Figs. 4 and 5 are perspective views of disks used in the faucet structure.

As illustrated in the accompanying drawing, the faucet includes a body 1 having a valve 2 turnably mounted therein. The valve 2 is provided with a transversely disposed port 3, and the body 1 is provided at its under side with compartment 4 into which the lower end of the said valve extends. A stop 5 is mounted upon the body 1 and a lug 6 is carried by the valve 2 and is adapted to engage the said stop, whereby the turning movement of the valve in the body 1 is limited, and when the said lug 6 is brought in contact with the stop 5, as shown in Fig. 1 of the drawing, the port 3 through the said valve is in register with the opening or passage way through the body 1.

A disk 7 is loosely mounted upon the lower portion of the valve 2 and the said disk is located in the compartment 4. The disk 7 is provided at its periphery with a number of notches 8 and a spring pressed pin 9 is movably mounted at the side of the body 1 and the said pin is located in the compartment 4. The pin is adapted to engage in one of the notches 8 whereby the disk 7 is held at a stationary position. A disk 10 is fixed to the lower end of the valve 2 and a coiled spring 11 surrounds that portion of the valve 2 which lies between the disks 7 and 9 and the end portions of the said spring are connected with the said disks, as best shown in Fig. 1 of the drawing. Inasmuch as the disk 7 is loosely mounted upon the valve 2 and the disk 10 is fixed with relation to the said valve, and by reason of the fact that the disk 7 is turned and the pin 9 is engaged with one of the notches 8, whereby the spring 11 is held under tension the said spring will, as soon as the valve is released, have a tendency to turn the valve, whereby the port 3 is turned transversely across the opening through the body 1, and thus the passage way through the said opening is normally closed.

A spring pressed buffer pin 12 is movably mounted within the compartment 4 of the body 1 and the disk 10 is provided with an outstanding lug 13, adapted to encounter the buffer pin 12, whereby the turning movement of the disk 10 in the direction indicated by the arrow in Fig. 2 is limited, when the said lug 13 comes in contact with the said pin. The disk 10 is further provided upon its upper side with an upstanding lug 14, the said lug having an inclined or beveled upper surface as best shown in Fig. 4 of the drawing.

A fitting 15 is connected with the lower side of the body 1 and the said fitting is provided with an opening 16 which registers with the opening through the body 1. The fitting 15 is provided at its upper end with a spider 17. A screw 18 is threaded through the hub of the spider 17, and a screw 19 is threaded through the lower portion of the fitting 15 at one side of the opening 16 therethrough. The screws 18 and 19 are in longitudinal alinement with each other and they support a shaft 20 the upper portion of which is approximately concentrically arranged with relation to the opening 16. A turbine member 21 is fixed to the upper portion of the shaft 20 and is located below the spider 17. The said turbine member 21 is located in the upper portion of the opening 16. An arbor 22 is journaled in the fitting 15, and a train of gear wheels 23 operatively connects the shaft 20 with the arbor 22.

A disk 24 is mounted at the upper end of the arbor 22 and is provided at its upper side with a lug 25, having a beveled or inclined upper surface as best shown in Fig. 5 of the drawing. A counter 26 is mounted in the body 1 and is provided at its side with a ratchet wheel 27. An arm 28 is movably mounted in the body 1 and the said arm carries at its upper end a spring pressed pawl 29, the free end of which bears against the periphery of the wheel 27. A spring 30 is interposed between the under side of the body 1 and the head 31 of the arm 28, and the said spring is under tension with a tendency to hold the head 31 toword the disk 24 and the lug 25 mounted thereon. The disk 24 is further provided with an outstanding lug 32. A bell crank lever 33 is fulcrumed in the compartment 4 of the body 1 and the upper end of the said bell crank lever lies above the upper surface of the disk 10. A spring 34 is mounted in the compartment 4 and bears at one end against the upper end of the bell crank lever 33 and is under tension with a tendency to hold the said upper end of the said lever toward the upper surface of the disk 10 and the lug 14 mounted thereon. A bar 35 is adjustably connected with the lower end of the lever 33 and a roller 36 is journaled at one end of the bar 35 and is held under the influence of the spring 34 against the periphery of the disk 24. A shaft 37 is journaled in the side of the compartment 4 of the body 1 and is provided at its outer end with a knob 38. The shaft 37 is provided at its inner end with a cam 39 which lies adjacent the side of the lower portion of the bell crank lever 33 as best shown in Fig. 1 of the drawing.

The operation of the faucet is as follows. When it is desired to permit the liquid to pass through the body 1, the valve 2 is turned to the position shown in Fig. 1, and the port 3 is brought into register with the opening through the body 1. When the port 3 is in register with the opening through the body, the lug 6 is in engagement with the stop 5 and the tension of the spring 11 has been increased and the lug 14 upon the disk 10 is brought against the upper end of the bell crank lever 33. Thus the valve 2 is temporarily locked in an open position by the contact of the lug 14 with the spring pressed lever 33. As the liquid flows through the body 1 it comes in contact with the turbine member 21, whereby the said turbine member and the shaft 20 are rotated. Through the transmitting train of gear wheels 23, rotary movement is imparted to the arbor 22, and thus the disk 24 is rotated and when the lug 25 passes under the head 31 of the arm 28, the said arm is moved longitudinally and the pawl 29 carried at the upper end thereof turns the ratchet wheel 27, whereby the counter 26 is operated and the numbers or figures at the front of the said counter are brought to view. As the disk 24 continues in its rotary movement, the lug 32 will encounter the roller 36 and move the bar 35 longitudinally and thus the bell crank lever 33 is swung, whereby the upper end of the said bell crank lever is lifted above the lug 14 and the disk 10 is thereby released and the valve 2 is unlocked. Just prior to this time or approximately after this time, the operator releases the valve 2 from his grasp and consequently the tension of the spring 11 comes into play and the disk 10 is turned so that the lug 13 is brought into engagement with the buffer pin 12 and the lug 14 is carried under the upper end of the bell crank lever 33. When the lug 13 encounters the buffer pin 12 the disk 10 and the valve 2 come to a state of rest, and inasmuch as the port 3 is then disposed transversely with relation to the opening through the body 1, the passage way through the said opening is closed and the turbine member 21 ceases to rotate. If, in the event that any of the parts connected with the turbine member should become disarranged and fail to operate as hereinbefore described, an operator grasps the knob 38 and turns the shaft 37 whereby the cam 39 will move the bell crank lever 33 and the lug 14 and disk 10 are released from the upper end of the said bell crank lever and the valve 2 may turn to a closed position in the body 1.

From the above description taken in conjunction with the accompanying drawing, it will be seen that a measuring or registering faucet of simple and durable structure is provided and that the parts mutually coöperate with each other to keep an accurate register of the quantity of liquid passed through the same. It will also be seen that the device automatically operates to close the faucet after a predetermined quantity of liquid has passed therethrough.

Having described the invention what is claimed is:—

1. A faucet comprising a body, a valve rotatably mounted therein, spring means for turning the valve to a closed position in the body, a disk carried by the valve and having a lug, a spring pressed lever adapted to be encountered by the lug, a second disk lying parallel with the first mentioned disk and having a lug adapted to swing the lever, a turbine member rotatably mounted in the body, and means operatively connecting the turbine member with the last mentioned disk.

2. A faucet comprising a body, a valve rotatably mounted in the body, spaced disks mounted upon the valve, one of said disks being fixed to the valve and the other disk being loose upon the valve, a spring connected with both of said disks, means for fixing the loose disk in a stationary position, means mounted upon the body and engageable with the fixed disk for locking the valve at an open position, a turbine member mounted in the body and means operatively connecting the turbine member with the locking means to move said locking means to released position.

In testimony whereof I affix my signature in presence of two witnesses.

FREDERICK MARQUARDT.

Witnesses:
ANNA V. DOYLE,
GEO. A. BYRNE.